US 12,445,861 B2

(12) United States Patent
Zhu et al.

(10) Patent No.: US 12,445,861 B2
(45) Date of Patent: Oct. 14, 2025

(54) TECHNIQUES FOR BEAM SELECTION WITH UPLINK CONSIDERATION

(71) Applicant: QUALCOMM Incorporated, San Diego, CA (US)

(72) Inventors: Jun Zhu, San Diego, CA (US); Raghu Narayan Challa, San Diego, CA (US); Brian Clarke Banister, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 519 days.

(21) Appl. No.: 17/901,440

(22) Filed: Sep. 1, 2022

(65) Prior Publication Data

US 2024/0080680 A1 Mar. 7, 2024

(51) Int. Cl.
*H04L 12/00* (2006.01)
*H04W 16/28* (2009.01)
*H04W 24/08* (2009.01)
*H04W 24/10* (2009.01)

(52) U.S. Cl.
CPC ........... *H04W 16/28* (2013.01); *H04W 24/08* (2013.01); *H04W 24/10* (2013.01)

(58) Field of Classification Search
CPC ..... H04W 16/28; H04W 24/08; H04W 24/10; H04B 7/06958; H04B 7/088; H04B 7/0632
USPC ....................................................... 370/329
See application file for complete search history.

(56) References Cited

U.S. PATENT DOCUMENTS

| | | | |
|---|---|---|---|
| 2020/0112926 A1 | 4/2020 | Laghate et al. | |
| 2021/0061412 A1* | 3/2021 | Kawakami | B62M 25/08 |
| 2021/0136703 A1* | 5/2021 | Kundargi | H04W 72/23 |
| 2022/0053486 A1 | 2/2022 | Abedini et al. | |
| 2023/0033247 A1* | 2/2023 | Zhu | H04W 24/08 |
| 2023/0036683 A1* | 2/2023 | Karri | H04B 7/0626 |
| 2023/0080611 A1* | 3/2023 | Sohn | H04W 16/28 |
| | | | 370/329 |
| 2023/0216573 A1* | 7/2023 | Tsai | H04B 17/336 |
| | | | 370/252 |

(Continued)

FOREIGN PATENT DOCUMENTS

WO WO-2021061412 A1 4/2021

OTHER PUBLICATIONS

International Search Report and Written Opinion—PCT/US2023/071728—ISA/EPO—Nov. 22, 2023.

*Primary Examiner* — Frantz Coby
(74) *Attorney, Agent, or Firm* — Holland & Hart LLP

(57) ABSTRACT

Methods, systems, and devices for wireless communication are described. A user equipment (UE) may select a set of candidate UE beams for measuring channel state information (CSI) reference signal (CSI-RS) based on one or more power measurements for uplink transmissions. The UE may measure multiple synchronization signal blocks (SSBs) using the set of candidate UE beams and select a subset of the selected candidate beams based on the SSB measurements. The UE may measure spectral efficiency via the resource carrying the CSI-RS using the subset of candidate UE beams and select a serving beam from the subset based on the spectral efficiency of each beam. The UE may calculate the power measurements based on a difference between a power threshold and a reference power value for each candidate beam.

30 Claims, 10 Drawing Sheets

(56) References Cited

U.S. PATENT DOCUMENTS

2024/0022299 A1* 1/2024 Zhu .................... H04B 7/0626
2024/0063859 A1* 2/2024 Grieco ................ H04L 5/0051

* cited by examiner

TECHNIQUES FOR BEAM SELECTION WITH UPLINK CONSIDERATION

FIELD OF DISCLOSURE

The following relates to wireless communication, including techniques for beam selection with uplink consideration.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for beam selection with uplink consideration. For example, a user equipment (UE) may select a set of candidate UE beams for measuring channel state information (CSI) reference signals (CSI-RS) based on one or more power measurements for uplink transmissions. The UE may measure multiple synchronization signal blocks (SSBs) using the set of candidate UE beams and select a subset of the selected candidate beams based on the SSB measurements (e.g., refine, update the list of candidate beams based on high reference signal received power (RSRP), channel impulse response, or both). The UE may measure spectral efficiency via the resource carrying the CSI-RS using the subset of candidate UE beams and select a serving beam from the subset based on the spectral efficiency of each beam (e.g., select the beam with best spectral efficiency). In some cases, the UE may calculate the power measurements based on a difference between a power threshold and a reference power value, where the power measurements may include virtual power headroom (vPHR) values for each candidate beam.

A method for wireless communication at a UE is described. The method may include measuring a set of synchronization signal blocks, selecting a set of candidate beams for measuring a channel state information reference signal based on a power measurement associated with an uplink performance, selecting a subset of the candidate beams for measuring the channel state information reference signal based on the set of synchronization signal block measurements, measuring a spectral efficiency using a first candidate beam from the subset of the set of candidate beams based on the channel state information reference signal, and transmitting, to a network entity, the spectral efficiency measurement based on measuring the spectral efficiency using the candidate UE beam.

An apparatus for wireless communication at a UE is described. The apparatus may include a processor, memory coupled with the processor, and instructions stored in the memory. The instructions may be executable by the processor to cause the apparatus to measure a set of synchronization signal blocks, select a set of candidate beams for measuring a channel state information reference signal based on a power measurement associated with an uplink performance, select a subset of the candidate beams for measuring the channel state information reference signal based on the set of synchronization signal block measurements, measure a spectral efficiency using a first candidate beam from the subset of the set of candidate beams based on the channel state information reference signal, and transmit, to a network entity, the spectral efficiency measurement based on measuring the spectral efficiency using the candidate UE beam.

Another apparatus for wireless communication at a UE is described. The apparatus may include means for measuring a set of synchronization signal blocks, means for selecting a set of candidate beams for measuring a channel state information reference signal based on a power measurement associated with an uplink performance, means for selecting a subset of the candidate beams for measuring the channel state information reference signal based on the set of synchronization signal block measurements, means for measuring a spectral efficiency using a first candidate beam from the subset of the set of candidate beams based on the channel state information reference signal, and means for transmitting, to a network entity, the spectral efficiency measurement based on measuring the spectral efficiency using the candidate UE beam.

A non-transitory computer-readable medium storing code for wireless communication at a UE is described. The code may include instructions executable by a processor to measure a set of synchronization signal blocks, select a set of candidate beams for measuring a channel state information reference signal based on a power measurement associated with an uplink performance, select a subset of the candidate beams for measuring the channel state information reference signal based on the set of synchronization signal block measurements, measure a spectral efficiency using a first candidate beam from the subset of the set of candidate beams based on the channel state information reference signal, and transmit, to a network entity, the spectral efficiency measurement based on measuring the spectral efficiency using the candidate UE beam.

Some examples of the method, apparatuses, and non-transitory computer-readable medium described herein may further include operations, features, means, or instructions for calculating the power measurement based on a difference between a power threshold and a reference power value and determining a quantity of UE beams for the set of candidate UE beams based on the calculated power measurement.

Some examples of the method, apparatuses, and non-transitory computer-readable medium described herein may further include operations, features, means, or instructions for calculating the power threshold based on a difference between a transmit power value, a first power reduction value, and a second power reduction value, where the power threshold may be a maximum transmit power limit.

Some examples of the method, apparatuses, and non-transitory computer-readable medium described herein may further include operations, features, means, or instructions for calculating the reference power value based on a combination of an uplink channel value, a pathloss value, a frequency, and a bandwidth value, where the reference power value may be a reference requested power.

In some examples of the method, apparatuses, and non-transitory computer-readable medium described herein, the bandwidth value includes a maximum transmission bandwidth and a quantity of carriers.

In some examples of the method, apparatuses, and non-transitory computer-readable medium described herein, the power measurement includes one or more virtual power headroom values associated with respective beams of the set of candidate UE beams.

Some examples of the method, apparatuses, and non-transitory computer-readable medium described herein may further include operations, features, means, or instructions for selecting the set of candidate UE beams may be based on the power measurement being positive.

Some examples of the method, apparatuses, and non-transitory computer-readable medium described herein may further include operations, features, means, or instructions for selecting a serving UE beam for measuring the channel state information reference signal based on the set of synchronization signal block measurements and generating a measurement report based on the spectral efficiency measurement and a last channel state information reference signal measurement on the serving UE beam.

Some examples of the method, apparatuses, and non-transitory computer-readable medium described herein may further include operations, features, means, or instructions for reselecting the serving UE beam based on measuring the channel state information reference signal.

In some examples of the method, apparatuses, and non-transitory computer-readable medium described herein, reselecting the serving UE beam may include operations, features, means, or instructions for performing a filtering, a biasing, a thresholding, or any combination thereof, for a first rank and a second rank of a measurement of the channel state information reference signal, where reselection of the serving UE beam may be based on the filtering, the biasing, the thresholding, or any combination thereof.

Some examples of the method, apparatuses, and non-transitory computer-readable medium described herein may further include operations, features, means, or instructions for predicting a set of time resources for the channel state information reference signal based on one or more previous channel state information reference signal configurations.

Some examples of the method, apparatuses, and non-transitory computer-readable medium described herein may further include operations, features, means, or instructions for determining a slot format for a slot including a set of time resources for the channel state information reference signal, where the slot format includes at least one downlink shared channel resource and monitoring the slot using the candidate UE beam based on determining the slot format, where the channel state information reference signal may be measured based on monitoring the slot.

Some examples of the method, apparatuses, and non-transitory computer-readable medium described herein may further include operations, features, means, or instructions for measuring a demodulation reference signal on the at least one downlink shared channel resource using the candidate UE beam and performing channel estimation for the slot based on measuring the demodulation reference signal.

Some examples of the method, apparatuses, and non-transitory computer-readable medium described herein may further include operations, features, means, or instructions for using the candidate UE beam for a set of multiple slots based on a time window around a set of time resources for the channel state information reference signal, where the channel state information reference signal may be measured during at least a symbol in the set of multiple slots.

Some examples of the method, apparatuses, and non-transitory computer-readable medium described herein may further include operations, features, means, or instructions for determining a scheduling variation for the network entity, where the candidate UE beam may be used for the set of multiple slots based on the scheduling variation.

In some examples of the method, apparatuses, and non-transitory computer-readable medium described herein, using the candidate UE beam for the set of multiple slots may include operations, features, means, or instructions for using the candidate UE beam for uplink communications and downlink communications during the set of multiple slots.

Some examples of the method, apparatuses, and non-transitory computer-readable medium described herein may further include operations, features, means, or instructions for monitoring a slot including a set of time resources for the channel state information reference signal using the candidate UE beam, where the channel state information reference signal may be measured on a different symbol of the slot than a predicted symbol for the channel state information reference signal of the set of time resources.

Some examples of the method, apparatuses, and non-transitory computer-readable medium described herein may further include operations, features, means, or instructions for identifying a set of time resources for the channel state information reference signal based on one or more previous channel state information reference signal configurations, identifying an aperiodic reference signal resource configuration from the one or more previous channel state information reference signal configurations, and determining scheduling information for one or more previous channel state information measurements based on the aperiodic reference signal resource configuration, where the set of time resources may be identified based on the scheduling information.

Some examples of the method, apparatuses, and non-transitory computer-readable medium described herein may further include operations, features, means, or instructions for measuring the spectral efficiency separately for each rank of the candidate UE beam.

Some examples of the method, apparatuses, and non-transitory computer-readable medium described herein may further include operations, features, means, or instructions for updating the subset based on measuring the channel state information reference signal, additional synchronization signal block measurements, one or more channel state information reference signal measurements using one or more additional candidate UE beams, or any combination thereof.

In some examples of the method, apparatuses, and non-transitory computer-readable medium described herein, identifying the subset may include operations, features, means, or instructions for identifying the subset from a subset of beams used for the set of synchronization signal block measurements.

In some examples of the method, apparatuses, and non-transitory computer-readable medium described herein, the subset of the candidate UE beams may be identified based on a reference signal received power measurement of the subset of beams used for the set of synchronization signal block measurements.

In some examples of the method, apparatuses, and non-transitory computer-readable medium described herein, the subset of the candidate UE beams may be identified based on a channel impulse response measurement of the subset of beams used for the set of synchronization signal block measurements.

In some examples of the method, apparatuses, and non-transitory computer-readable medium described herein, the subset of the candidate UE beams may be identified based on an uplink link budget of the UE.

In some examples of the method, apparatuses, and non-transitory computer-readable medium described herein, the channel state information reference signal may be an acquisition channel state information reference signal.

DETAILED DESCRIPTION

A wireless communications system may support beamformed communications. For example, a network entity may communicate with a user equipment (UE) using one or more beams from the network entity (e.g., network entity beams), and the UE may communicate with the network entity using one or more beams from the UE (e.g., UE beams). The UE may measure synchronization signal blocks (SSBs) using multiple UE beams and select a serving beam to communicate with the network entity (e.g., a strongest candidate beam) based on the measurements. The UE may further identify candidate UE beams for beam refinement (e.g., for future communication) based on the SSB measurements and measure channel state information (CSI) reference signals (CSI-RS) using the candidate beams. For example, the UE may identify a set of candidate UE beams based on UE beams with a high reference signal received power (RSRP) measurement, high channel impulse response measurement, or both. The UE may select and switch to a second serving beam (e.g., a best candidate beam) based on performing CSI-RS measurements associated with downlink communications using the set of candidate beams (e.g., spectral efficiency measurements on the resource carrying the CSI-RS). However, identifying the set of candidate UE beams based on the SSB measurements without uplink consideration may result in low performance beams for uplink communication.

The present disclosure provides techniques for selecting candidate UE beams for measuring CSI-RS based on uplink communication considerations. For example, a UE may select a set of candidate UE beams for measuring CSI-RS based on one or more power measurements for uplink transmissions. The UE may measure multiple SSBs using the set of candidate UE beams and select a subset of the selected candidate beams based on the SSB measurements (e.g., refine, update the list of candidate beams based on high RSRP, channel impulse response, or both). The UE may measure spectral efficiency via the resource carrying the CSI-RS using the subset of candidate UE beams and select a serving beam from the subset based on the spectral efficiency of each beam (e.g., select the beam with best spectral efficiency). In some cases, the UE may calculate the power measurements based on a difference between a power threshold and a reference power value, where the power measurements may include virtual power headroom (vPHR) values for each candidate beam.

Aspects of the disclosure are initially described in the context of wireless communications systems and then a process flow. Aspects of the disclosure are further illustrated by and described with reference to apparatus diagrams, system diagrams, and flowcharts that relate to techniques for beam selection with uplink consideration.

Figure 1:
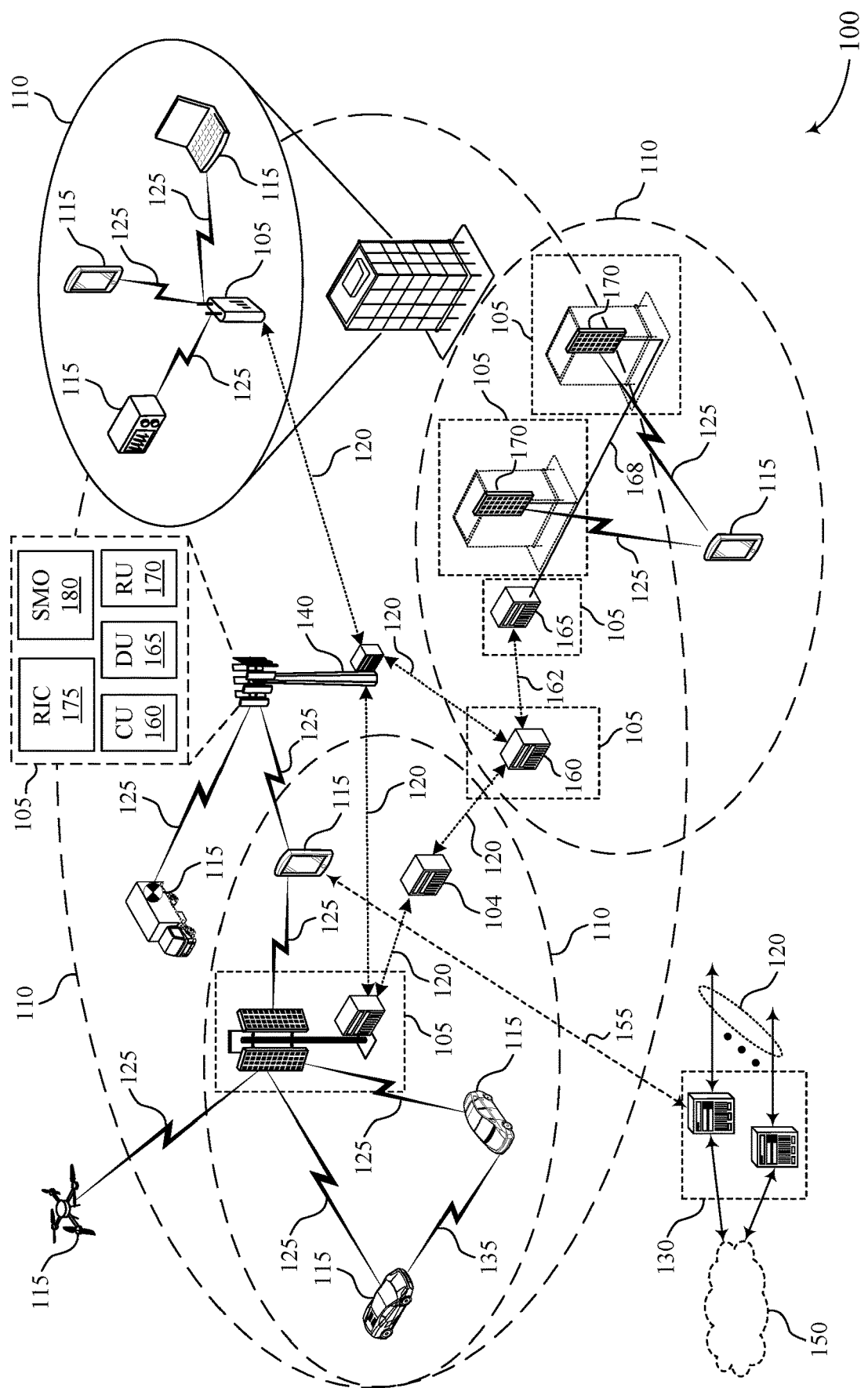
FIG. 1 illustrates an example of a wireless communications system that supports techniques for beam selection with uplink consideration in accordance with one or more aspects of the present disclosure.

FIG. 1 illustrates an example of a wireless communications system 100 that supports techniques for beam selection with uplink consideration in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for beam selection with uplink consideration as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and N f may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., N f) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). For example, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along some orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a some orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a CSI-RS), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some examples, a UE 115 may use CSI (e.g., rank) for receiver beam selection. In some cases, a CSI-RS may be quasi collocated (QCL) to a serving SSB or aperiodic CSI-RS network configured. The UE 115 may sweep candidate UE beams on CSI-RS if the channel is stationary for a duration of time and report a CSI feedback (CSF) report based on a previous measurement. The UE 115 may update the CSF from DMRS associated with the channel and a channel estimation. In some cases, the CSI-RS may be QCL to a non-serving SSB. The UE 115 may sweep candidate UE beams on CSI-RS QCL to non-serving SSBs for periodic CSI-RS.

In some cases, UE beam management may be based on either SSB or CSI-RS process three (P3) (e.g., in 5G frequency two (F2)). For example, SSB may be described as a rank-1 periodic reference signal that is guaranteed to be transmitted (e.g., transmitted by all infra vendors). However, a UE beam selection based on SSB is limited in the metrics that it can optimize because of its rank-1 nature. For example, mathematically, SSB may not be used for optimizing rank-2 performance. CSI-RS P3 may be an optional reference signal that may be configured differently across networks.

In some implementations, a UE 115 may select beams for measuring CSI-RS based on uplink communication considerations, which may result in more efficient selection of UE beams for uplink performance and a selection procedure compatible with multiple types of CSI-RS beam scheduling (e.g., CSF, CSI-RS for acquisition, CSI-RS P3, and the like). For example, the UE 115 may select a set of candidate UE beams for measuring CSI-RS based on one or more power measurements for uplink transmissions. The UE 115 may measure multiple SSBs using the set of candidate UE beams and select a subset of the selected candidate beams based on the SSB measurements (e.g., refine, update the list of candidate beams based on high RSRP, channel impulse response, or both). The UE 115 may measure spectral efficiency via the resource carrying the CSI-RS using the subset of candidate UE beams and select a serving beam from the subset based on the spectral efficiency of each beam (e.g., select the beam with best spectral efficiency). In some cases, the UE 115 may calculate the power measurements based on a difference between a power threshold and a reference power value, where the power measurements may include vPHR values for each candidate beam.

Figure 2:
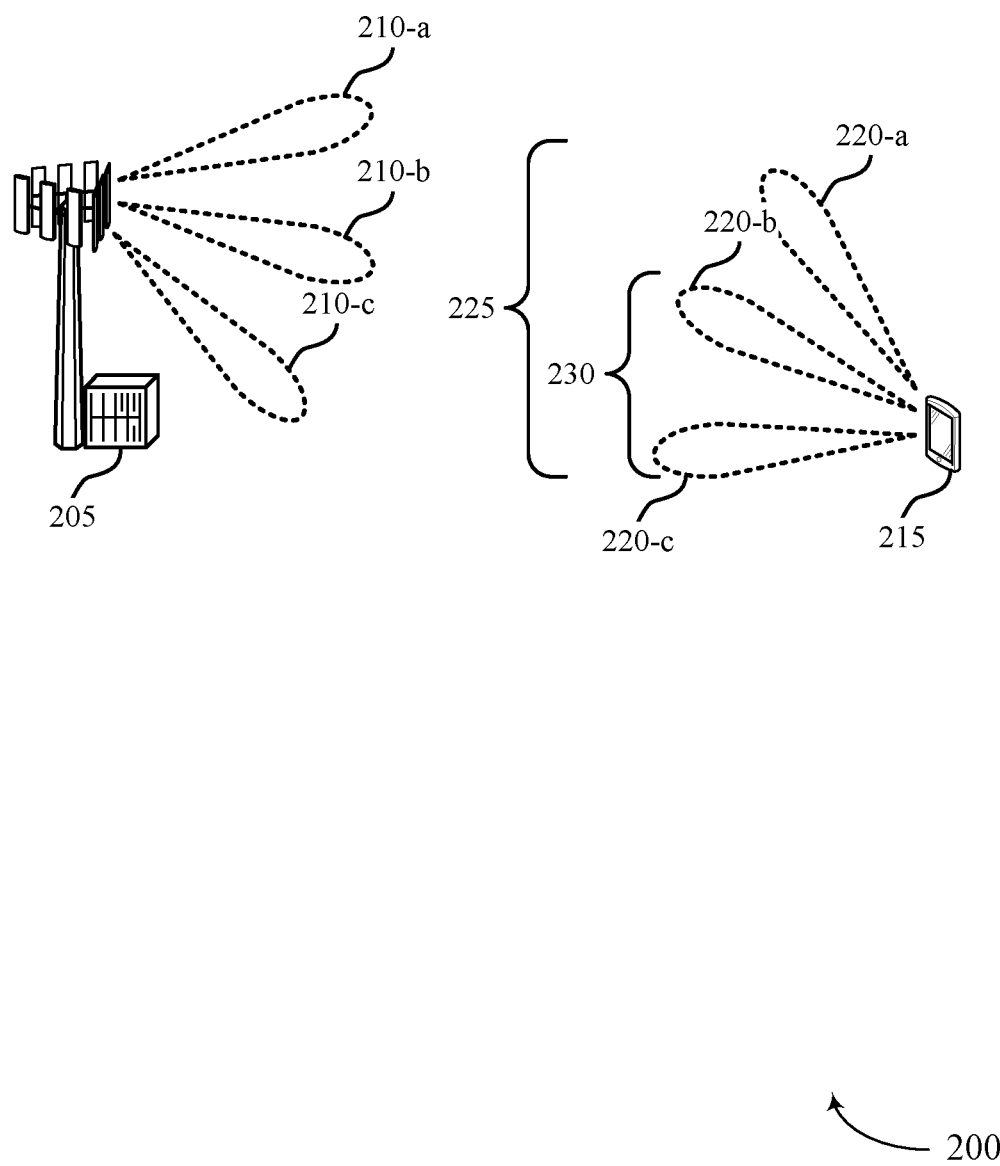
FIG. 2 illustrates an example of a wireless communications system that supports techniques for beam selection with uplink consideration in accordance with one or more aspects of the present disclosure.

FIG. 2 illustrates an example of a wireless communications system 200 that supports techniques for beam selection with uplink consideration in accordance with one or more aspects of the present disclosure. The wireless communications system 200 may implement aspects of or be an example of a wireless communications system 100. The wireless communications system 200 may include a UE 215 and a network entity 205, which may be respective examples of a UE 115 and a network entity 105 as described with reference to FIG. 1.

The wireless communications system 200 may support beamformed communications. For example, the network entity 205 may communicate with the UE 215 using one or more network entity beams 210, and the UE 215 may communicate with the network entity 205 using one or more UE beams 220. For example, the network entity beams 210 may include a network entity beam 210-a, a network entity beam 210-b, and a network entity beam 210-c.

The UE 215 may measure SSBs using multiple UE beams 220 and select a beam as a serving UE beam based on the measurements. For example, the UE 215 may measure SSBs using at least a UE beam 220-a, a UE beam 220-b, and a UE beam 220-c (e.g., candidate UE beams). In an example, the UE 215 may select the UE beam 220-b as a serving UE beam based on the UE beam 220-b having a highest RSRP measurement on the corresponding SSB. A serving UE beam may, for example, be used to receive or transmit on PDCCH, PDSCH, a physical uplink control channel (PUCCH), a physical uplink shared channel (PUSCH), or a random access channel (RACH) message (e.g., RACH message 3), or any combination thereof. For example, the serving UE beam may be selected for control or data signaling to or from the network entity 205.

The UE 215 may be configured to measure CSI-RS (e.g., for acquisition, for P3) using candidate UE beams from a set of beams used for serving SSB measurements. In some cases, the UE 215 may receive control signaling from the network entity 205 configuring the UE 215 to perform CSI-RS measurements associated with downlink communications (e.g., spectral efficiency measurements) using the candidate UE beams and select a serving beam based on the downlink measurement. However, identifying a set of candidate beams based on the SSB measurements without uplink consideration may result in low performance beams for uplink communication. For example, due to potential rank mismatches between uplink and downlink communications, a UE beam selected based on a spectral efficiency measurement without consideration for uplink may be suited for (e.g., optimal for) downlink communication but may not be a best beam (e.g., optimal beam) for uplink communication. Therefore, a selection procedure that considers both uplink and downlink performance may result in more efficient combined communication between the uplink and downlink channels.

In some implementations, the UE 215 may select a set of candidate UE beams 225 based on uplink considerations. For example, the UE 215 may calculate a power measurement associated with uplink transmission for each candidate UE beam. The set of candidate UE beams 225 may include, for example, the UE beam 220-a, the UE beam 220-b, and the UE beam 220-c, based on the power measurements.

In some cases, the power measurement may be a vPHR measurement. The vPHR may indicate a power headroom value for a reference full resource block PUSCH transmission on each port (e.g., each antenna port) of the UE 215. For example, the power headroom may indicate how much transmission power the UE 215 may use in addition to the power already being utilized (e.g., power used by ongoing transmissions) without going over a power threshold. In some cases, the power threshold may be a maximum transmit power limit (MTPL). In some cases, the vPHR may be different from an actual power headroom of the UE 215.

The UE 215 may calculate the vPHR based on a difference between the power threshold (e.g., MTPL) and a reference power value. For example, vPHR may be calculated using:

$$\text{vPHR} = \text{MTPL} - P_{tx_{ref}} \qquad \text{Equation 1:}$$

where $P_{tx_{ref}}$ represents a reference requested power for channel transmission (e.g., the reference power value). MTPL and $P_{tx_{ref}}$ may be calculated using:

$$\text{MTPL} = P_{bump} - \text{PMRP} - \text{MPR} \qquad \text{Equation 2:}$$

$$P_{tx_{ref}} = P0_{PUSCH} + PL + f + 10 \log_{10}(2^\mu \times N_{RB} \times N_{carrier}) \quad \text{Equation 3:}$$

respectively. Where $P_{bump}$ represents a transmit power value (e.g., an absolute transmit power, static power), PMRP (power management-maximum power reduction) represents a first power reduction value (e.g., power reduction due to maximum power exposure (MPE) limit, dynamic power), and MPR (maximum power reduction) represents a second power reduction value (e.g., power backoff due to waveform type, modulation, semi-static power); and $P0_{PUSCH}$ represents an uplink channel value (e.g., configured by the network entity 205), PL represents a pathloss value for a beam, f represents frequency associated with transmit power control (TPC) team (e.g., filtered and quantified), $N_{RB}$ represents a maximum transmission bandwidth (e.g., a quantity of resource blocks, full resource block), and $N_{carrier}$ represents a quantity of carriers (e.g., all active carriers).

In some implementations, the UE 215 may determine a quantity of UE beams for the set of candidate beams 225 based on the power measurement. For example, the UE 215 may set a UE beam threshold (e.g., limit). The UE beam threshold may be associated with a ratio between a UE beam with the best RSRP and another UE beam. For example, the UE 215 may determine that the UE beam 220-b may have a highest measured RSRP of the set of UE beams used for serving SSB measurements. If the UE 215 is relatively close to the network entity 205 (e.g., $P0_{PUSCH}$ is configured low), then the pathloss for the UE beam 220-b may be relatively small and the UE 215 may set the UE beam threshold to be a relatively large value (e.g., six decibel (dB)). If the UE 215 is relatively far (e.g., an edge cell scenario) from the network entity 205 (e.g., $P0_{PUSCH}$ is configured high), then the pathloss for the UE beam 220-b may be relatively large and the UE 215 may set the UE beam threshold to be a relatively small value (e.g., one decibel (dB)). The UE 215 may include all UE beams within the UE beam threshold value (e.g., 6 dB or 1 dB) below the UE beam 220-b within the set of candidate UE beams 225 (e.g., such that vPHR values for all beams in the set of candidate UE beams 225 are positive). In some cases, the UE beam threshold may be zero, such that the only beam within the set of candidate UE beams 225 is the UE beam with the best RSRP (e.g., the UE beam 220-b). While the UE beam 220-b was used with a UE beam threshold of 6 dB and 1 dB as examples, other values are possible. The UE beam threshold may be any value such that vPHR of all beams within the set of candidate UE beams 225 are positive values.

The UE 215 may select a subset of the candidate UE beams for measuring CSI-RS based on, or identified from, a set of beams used for serving SSB measurements. For example, the UE 215 may measure an SSB for each beam of the set of candidate UE beams 225. The UE 215 may select a top K beams from SSB measurements to be included in a subset of candidate UE beams 230. In some cases, the top K beams may be determined based on highest RSRP measurements, channel impulse response measurements, or both. Additionally, or alternatively, the top K beams may be identified based on previous CSI-RS measurements. For example, the UE 215 may update or select the subset of candidate UE beams 230 based on previous CSI-RS measurements using previous serving UE beams or previous candidate UE beams. In some examples, the subset of candidate UE beams 230 may include the UE beam 220-b and the UE beam 220-c.

In some cases, the UE 215 may measure spectral efficiency on the resource carrying the CSI-RS. In some cases, spectral efficiency may be measured for each rank separately. In some cases, the UE 215 may perform filtering, biasing, or thresholding for a first rank and a second rank of the CSI-RS measurement. In some cases, the CSI-RS may be CSI-RS used for cell acquisition, CSI-RS P3, or any other type of CSI-RS.

The UE 215 may prepare a report to the network entity 205 including either a last measurement on the serving UE beam (e.g., the UE beam 220-b) or a recent measurement (e.g., the spectral efficiency measurement) of a candidate UE beam (e.g., the UE beam 220-c). In some cases, the report may be generated based on, or include information for, both a recent measurement for the serving UE beam and measurements for one or more candidate UE beams. The UE 215 may then transmit the report to the network entity 205. The UE 215 or the network entity 205, or both, may process the measured spectral efficiency for serving beam selection. In some cases, the measured spectral efficiency may be processed to update or reselect a serving UE beam. In some examples, the network entity 205 may update a network entity beam 210 or update a configuration for a beam pair link based on the measured spectral efficiency.

In some examples, the UE 215 may sweep UE beams 220 to measure CSI-RS with different UE candidate beams over multiple occasions. For example, at a first occasion, the UE 215 may measure a first CSI-RS using UE beam 220-a (e.g., a candidate UE beam), then measure a second CSI-RS using UE beam 220-b (e.g., the serving UE beam), then measure a third CSI-RS using UE beam 220-c (e.g., another candidate UE beam). These techniques may provide enhanced beam selection, which may lead to selecting stronger beams and greater throughput.

In some cases, the UE 215 may identify a slot and symbol where resources for the CSI-RS will be scheduled. In some wireless communications systems, a UE 115 may identify the slot and symbol based on PDCCH in a same slot as the resources for the CSI-RS. However, the UE 115 in these systems may not have sufficient time to both process the PDCCH indicating the CSI-RS and switch to a candidate UE beam (e.g., from the serving UE beam).

The UE 215 may implement techniques to predict the slot and symbol of the resources for the CSI-RS to support measuring CSI-RS using candidate UE beams. For example, the UE 215 may estimate a slot or symbol, or both, for the CSI-RS based on past scheduled aperiodic resources or CSI-RS configurations, or both. The UE 215 may schedule either a candidate UE beam (e.g., the UE beam 220-a or the UE beam 220-c) or the serving UE beam (e.g., the UE beam 220-b) for at least the identified symbol during the identified slot. This may enable the UE 215 to measure the CSI-RS using the candidate UE beam without waiting to process the PDCCH, as the resources carrying the CSI-RS may have already occurred once the PDCCH is processed.

In some cases, the UE 215 may schedule a UE beam 220 for the entire slot when scheduling the UE beam 220 for the CSI-RS symbol. In some examples, there may be PDCCH and PDSCH in the same slot. The PDSCH may be frequency division multiplexed on the same symbol as CSI-RS. Using the same beam throughout the slot may provide better channel estimation using the PDSCH DMRS which may be on another symbol of the same slot. If the CSI-RS slot prediction is inaccurate (e.g., due to scheduling variations at network entity 205), then the UE 215 may use the same beam for multiple slots in a time window around the predicted slot.

Some slots may include DMRS resources, which may be used to aperiodically transmit downlink data grants. Downlink grants may be aperiodically transmitted, as the scheduled data may often be aperiodic. The network may indicate a presence of PDSCH and DMRS symbols through downlink control information on a PDCCH symbol K0 slots before the PDSCH. Some systems may use K0=0, where the PDCCH resources and the PDSCH resources are in a same slot. Information for the PDSCH and DMRS may be indicated by the scheduling downlink control information. In some cases, if a PDSCH grant is rank-2, then the DMRS may also be rank-2.

In some examples, similar techniques may be used to sweep UE beams 220 on PDSCH slots and measure spectral efficiency or SNR on DMRS transmitted during the PDSCH slots. For example, the UE 215 may identify a set of candidate beams and select a serving UE beam. The UE 215 may count a quantity of downlink grants with DMRS and switch from the serving UE beam to a candidate UE beam after reaching a threshold quantity of downlink grants with DMRS. In some cases, the UE 215 may switch to the candidate UE beam for all channels of one or more slots. The UE 215 may perform SNR or spectral efficiency measurements based on the DMRS received using the candidate UE beam. The UE 215 may then transmit a measurement report to the network entity 205 indicate either a measurement based on a last DMRS (e.g., a last SNR or spectral efficiency measurement) received using the UE serving beam or one or more measurements based on a DMRS received using the candidate UE beam, or both. In some cases, some techniques or aspects for using a candidate UE beam to measure CSI-RS may be implemented to measure DMRS using a candidate UE beam.

Figure 3:
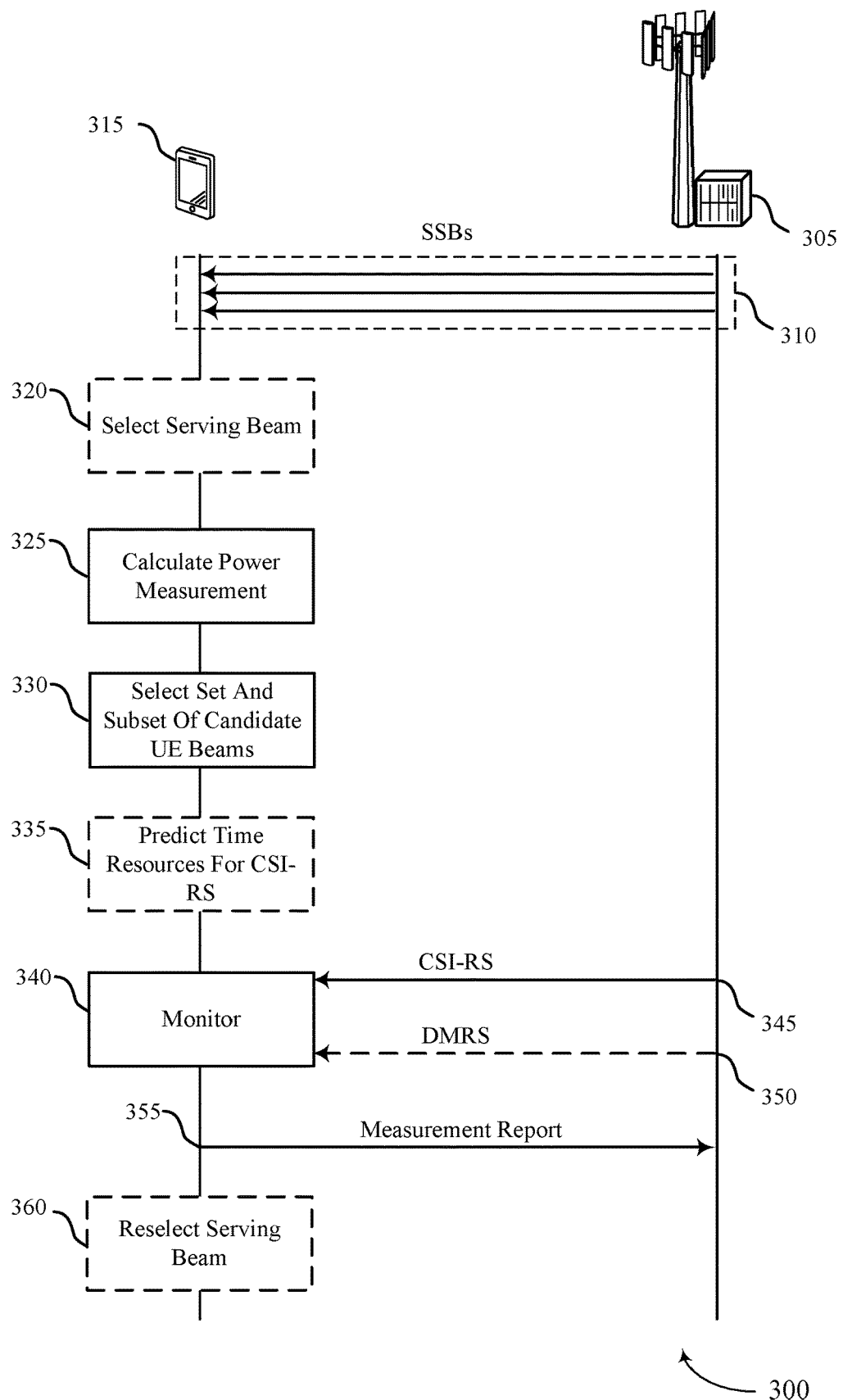
FIG. 3 illustrates an example of a process flow that supports techniques for beam selection with uplink consideration in accordance with one or more aspects of the present disclosure.

FIG. 3 illustrates an example of a process flow 300 that supports techniques for beam selection with uplink consideration in accordance with one or more aspects of the present disclosure. The process flow 300 may include a UE 315 and a network entity 305, which may be respective examples of a UE 115 and a network entity 105 as described with reference to FIG. 1.

The network entity 305 may periodically transmit SSBs. The SSBs may be measured by UEs 115, such as the UE 315, within a coverage area of the network entity 305 to synchronize with the network entity 305 or select serving beams. The UE 315 may perform a set of SSB measurements at 310. For example, the UE 315 may measure the different SSBs to identify a strong UE beam, network entity beam, or beam pair link. The SSBs may have a one-to-one mapping to different network entity beams of the network entity 305. Therefore, the UE 315 may measure multiple different beams. In some cases, the UE 315 may measure an RSRP a channel impulse response, or another characteristic of the SSBs.

At 320, the UE 315 may optionally select a serving UE beam. For example, the UE 315 may select a UE beam associated with an SSB which has a highest RSRP measurement of the set of SSB measurements for the serving UE beam. The serving UE beam may be used to receive or transmit on PDCCH, PDSCH, PUCCH, PUSCH, RACH messages, or any combination thereof. In some cases, the UE 315 may select the serving UE beam for control signaling, data signaling, or both, on uplink, downlink, or both channels (e.g., to or from the network entity 305).

At 325, the UE 315 may calculate one or more power measurements. For example, the UE 315 may calculate a reference power value associated with each candidate beam based on a combination of an uplink channel value, a pathloss value, a frequency, and a bandwidth value, as described herein with reference to Equation 3 of FIG. 2. The UE 315 may calculate a power threshold associated with each candidate beam based on a difference between a transmit power value, a first power reduction value, and a second power reduction value, as described herein with reference to Equation 2 of FIG. 2. The UE 315 may calculate respective power measurements for each candidate beam based on a difference between the power threshold and the reference power value, as described herein with reference to Equation 1 of FIG. 2. In some cases, the power measurements may be examples of vPHR values for each candidate UE.

At 330, the UE 315 may select, from the candidate UE beams, a set of candidate UE beams for measuring a CSI-RS. For example, the UE 315 may determine a threshold value based on the power measurements for each UE beam. The threshold value may indicate a threshold below the serving beam (e.g., X dB below the serving beam in terms of SSB RSRP). All of the beams that satisfy the threshold (e.g., are above the threshold, are the same as the threshold) may be selected for the set of candidate UE beams. In some cases, the UE 315 may determine the threshold value based on the vPHR power measurements included in the set of candidate UE beams being positive values (e.g., values greater than zero).

The UE 315 may select, from the set of candidate UE beams, a subset of candidate UE beams for measuring a CSI-RS based on the set of SSB measurements. For example, the UE 315 may select the set of candidate UE beams based on an RSRP measurement of the set of beams used for the set of SSB measurements. For example, a top K UE beams based on an RSRP measurement, channel impulse response measurement, or other type of measurement, may be selected for the subset of candidate UE beams.

At 335, the UE 315 may optionally identify a set of time resources for the CSI-RS based on one or more previous CSI-RS configurations. In some cases, the UE 315 may predict the set of time resources based on the one or more previous CSI-RS configuration. For example, the UE 315 may predict when the CSI-RS will be transmitted (e.g., in which slot or in which symbol of the slot) in order to provide sufficient time to switch from a serving UE beam to a candidate UE beam. The CSI-RS may be transmitted in a slot with PDCCH that indicates the scheduling information for the CSI-RS. However, if the UE 315 waits to identify the scheduling information based on the PDCCH, the resources for the CSI-RS may have already passed once the PDCCH is processed. Therefore, the UE 315 may predict when the CSI-RS is to be transmitted in order to use the UE candidate beam to measure the CSI-RS.

The UE 315 may monitor downlink channels during at least the identified set of time resources using the candidate UE beam at 330. The network entity 305 may transmit a CSI-RS to the UE 315 at 345. The UE 315 may measure the CSI-RS based on the set of time resources using the candidate UE beam from the subset of candidate UE beams.

In some cases, the UE 315 may monitor a slot including the identified set of time resources using the candidate UE beam. For example, the UE 315 may communicate using the candidate UE beam for the whole slot to provide a higher likelihood of measuring the CSI-RS with the candidate UE beam. In some examples, the UE 315 may use the candidate UE beam for a set of multiple slots based on a time window around the set of time resources, where the CSI-RS is measured during at least a symbol in the set of multiple slots. For example, the UE 315 may use the candidate UE beam for multiple slots of the UE 315 detects scheduling variations at the network entity 305.

In some cases, the UE 315 may use a candidate UE beam for slightly longer periods across instances if the UE 315 predicts the time resources incorrectly. For example, the UE 315 may first perform symbol-based switching and attempt to switch from a serving UE beam to the candidate UE beam just for a predicted symbol carrying the CSI-RS. If the UE 315 predicted the symbol wrong, the UE 315 may perform slot-based switching and use the candidate UE beam for a full slot at a next instance. If the predicted slot for the slot-based switching is wrong, the UE 315 may use the candidate UE beam for a set of multiple slots according to a window around a predicted slot.

In some examples, the subset of UE candidate beams may be selected or updated based on previous CSI-RS measurements. For example, the UE 315 may update the set of candidate UE beams based on measuring the CSI-RS, additional SSB measurements, one or more CSI-RS measurements using one or more additional candidate UE beams, or any combination thereof.

In some examples, the network entity 305 and the UE 315 may implement techniques to measure PDSCH DMRS using candidate UE beams or perform UE beam sweeping for PDSCH DMRS. In some cases, the techniques for UE beam sweeping for PDSCH DMRS may be similar to some techniques used in the process flow 300 for beam selection using CSI-RS acquisition resources. For example, the UE 315 may calculate power measurements, perform a set of SSB measurements, and select a serving UE beam and a subset of candidate UE beams based on the SSB measurements at 310. The UE 315 may communicate with the network entity 305 and receive a threshold quantity of downlink grants with a DMRS using the serving UE beam.

Once the UE 315 receives the threshold quantity of downlink grants with DMRS, the UE 315 may switch to a candidate UE beam from the subset of candidate UE beams. For example, at 340, the UE 315 may monitor one or more wireless channels of a slot using a candidate UE beam from the subset of candidate UE beams based on receiving the threshold quantity of downlink grants. For example, the UE 315 may use the selected candidate UE beam for all channels of one or more slots to monitor for PDSCH DMRS. The network entity 305 may transmit DMRS on PDSCH resources of the slot at 350. The UE 315 may measure one or more DMRS transmitted over the one or more wireless channels of the slot using the candidate UE beam. Then similarly to 355, the UE 315 may transmit, to the network entity, a measurement report based on measuring the one or more DMRS using the candidate UE beam or a last measurement using the serving UE beam, or both. For example, the measurement report may include an SNR or spectral efficiency measurement made using the candidate UE beam or a previous SNR or spectral efficiency measurement made using the serving UE beam, or any combination thereof.

In some examples, the UE 315 may process a measurement of the CSI-RS, such as for serving beam selection purposes. For example, the UE 315 may process the measured spectral efficiency for serving beam selection purposes. For example, at 360 the UE 315 may perform filtering, biasing, or thresholding for a first rank and second rank of the measurement as part of reselecting the serving beam. In some cases, the UE 315 may select a serving beam (e.g., reselect the serving beam to a candidate UE beam from the set of candidate UE beams) based on the measured, filtered, or biased spectral efficiencies of the candidate beams.

Figure 4:
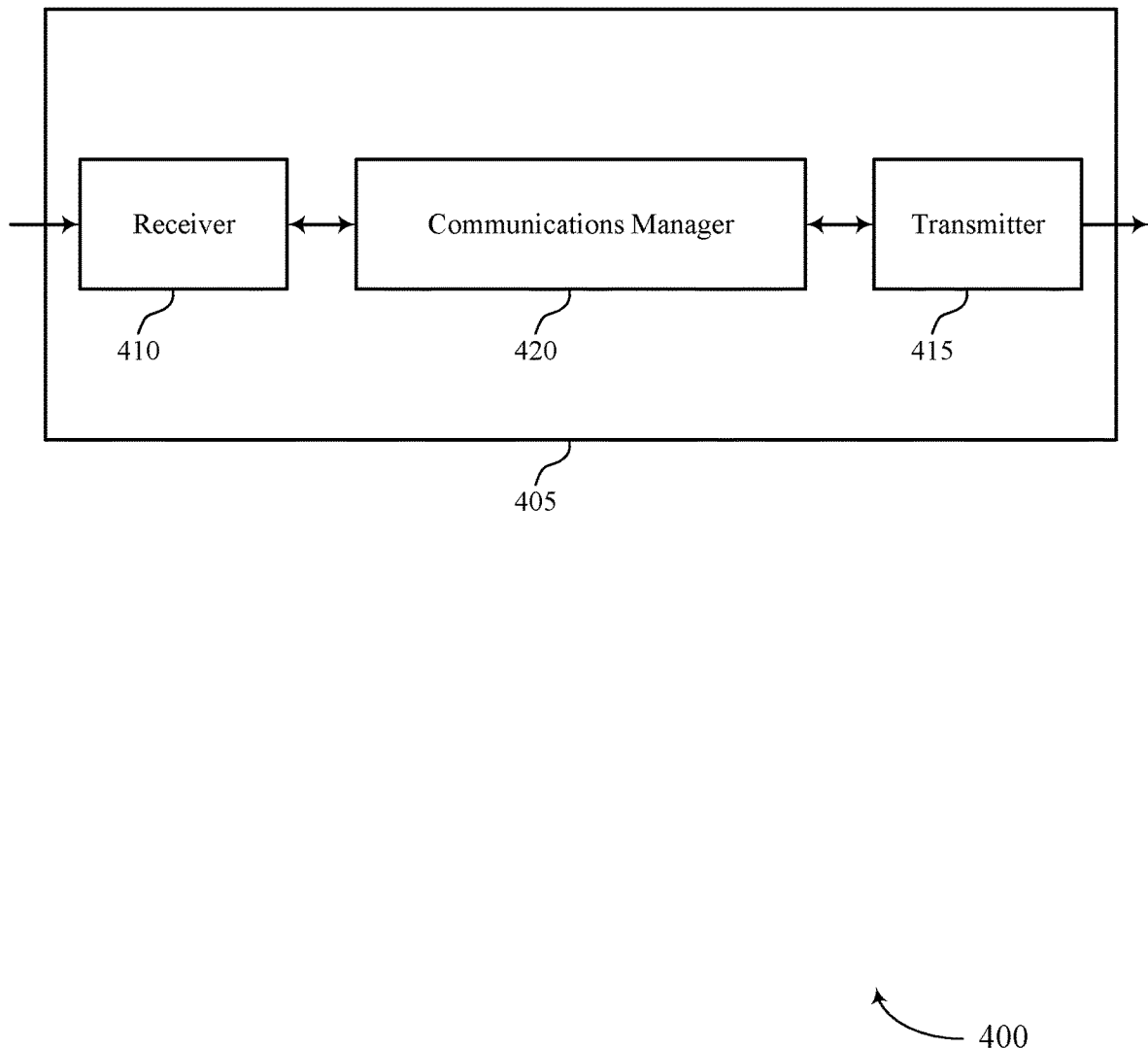
FIGS. 4 and 5 show block diagrams of devices that support techniques for beam selection with uplink consideration in accordance with one or more aspects of the present disclosure.

FIG. 4 shows a block diagram 400 of a device 405 that supports techniques for beam selection with uplink consideration in accordance with one or more aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for beam selection with uplink consideration). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for beam selection with uplink consideration). In some examples, the transmitter 415 may be co-located with a receiver 410 in a transceiver component. The transmitter 415 may utilize a single antenna or a set of multiple antennas.

The communications manager 420, the receiver 410, the transmitter 415, or various combinations thereof or various components thereof may be examples of means for performing various aspects of techniques for beam selection with uplink consideration as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communication at a UE in accordance with examples as disclosed herein. For example, the communications manager 420 may be configured as or otherwise support a means for measuring a set of SSBs. The communications manager 420 may be configured as or otherwise support a means for selecting a set of candidate beams for measuring a CSI-RS based on a power measurement associated with an uplink performance. The communications manager 420 may be configured as or otherwise support a means for selecting a subset of the candidate beams for measuring the CSI-RS based on the set of SSB measurements. The communications manager 420 may be configured as or otherwise support a means for measuring a spectral efficiency using a first candidate beam from the subset of the set of candidate beams based on the CSI-RS. The communications manager 420 may be configured as or otherwise support a means for transmitting, to a network entity, the spectral efficiency measurement based on measuring the spectral efficiency using the candidate UE beam.

By including or configuring the communications manager 420 in accordance with examples as described herein, the device 405 (e.g., a processor controlling or otherwise coupled with the receiver 410, the transmitter 415, the communications manager 420, or a combination thereof) may support techniques for increased uplink performance, more efficient selection of beams for uplink communication, and more efficient utilization of communication resources.

Figure 5:
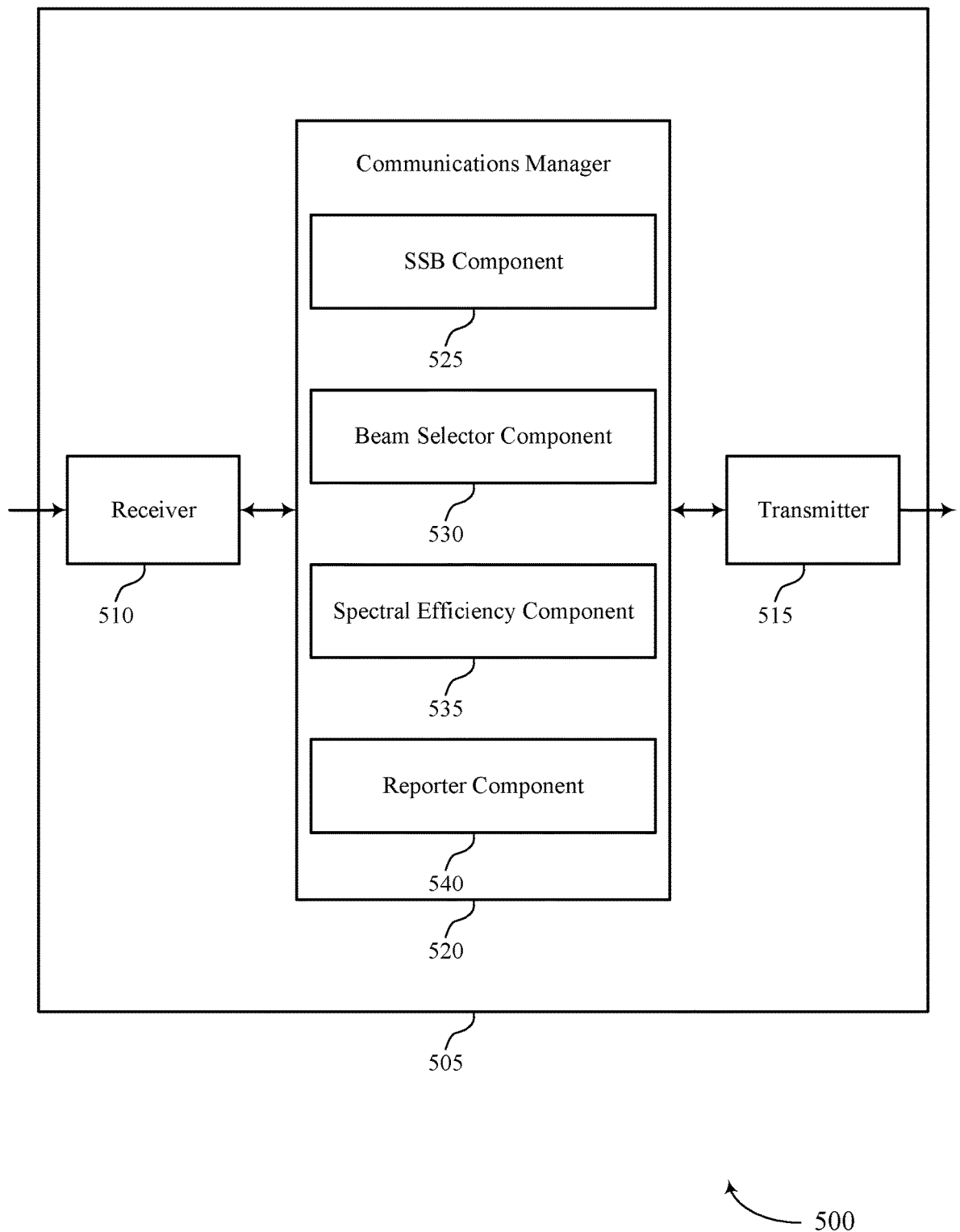

FIG. 5 shows a block diagram 500 of a device 505 that supports techniques for beam selection with uplink consideration in accordance with one or more aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for beam selection with uplink consideration). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for beam selection with uplink consideration). In some examples, the transmitter 515 may be co-located with a receiver 510 in a transceiver component. The transmitter 515 may utilize a single antenna or a set of multiple antennas.

The device 505, or various components thereof, may be an example of means for performing various aspects of techniques for beam selection with uplink consideration as described herein. For example, the communications manager 520 may include an SSB component 525, a beam selector component 530, a spectral efficiency component 535, a reporter component 540, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. The SSB component 525 may be configured as or otherwise support a means for measuring a set of SSBs. The beam selector component 530 may be configured as or otherwise support a means for selecting a set of candidate beams for measuring a CSI-RS based on a power measurement associated with an uplink performance. The beam selector component 530 may be configured as or otherwise support a means for selecting a subset of the candidate beams for measuring the CSI-RS based on the set of SSB measurements. The spectral efficiency component 535 may be configured as or otherwise support a means for measuring a spectral efficiency using a first candidate beam from the subset of the set of candidate beams based on the CSI-RS. The reporter component 540 may be configured as or otherwise support a means for transmitting, to a network entity, the spectral efficiency measurement based on measuring the spectral efficiency using the candidate UE beam.

Figure 6:
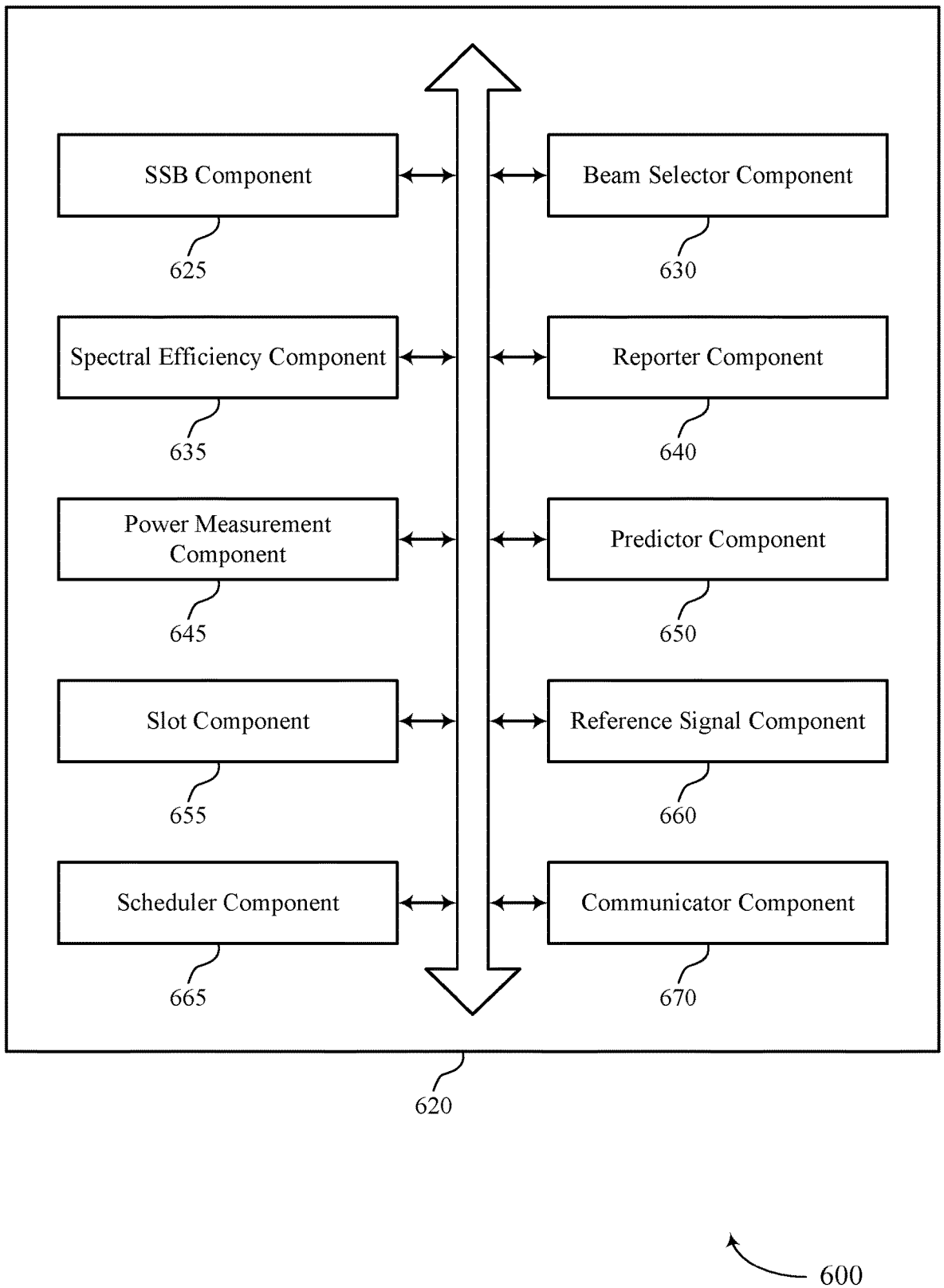
FIG. 6 shows a block diagram of a communications manager that supports techniques for beam selection with uplink consideration in accordance with one or more aspects of the present disclosure.

FIG. 6 shows a block diagram 600 of a communications manager 620 that supports techniques for beam selection with uplink consideration in accordance with one or more aspects of the present disclosure. The communications manager 620 may be an example of aspects of a communications manager 420, a communications manager 520, or both, as described herein. The communications manager 620, or various components thereof, may be an example of means for performing various aspects of techniques for beam selection with uplink consideration as described herein. For example, the communications manager 620 may include an SSB component 625, a beam selector component 630, a spectral efficiency component 635, a reporter component 640, a power measurement component 645, a predictor component 650, a slot component 655, a reference signal component 660, a scheduler component 665, a communicator component 670, or any combination thereof. Each of these components may communicate, directly or indirectly, with one another (e.g., via one or more buses).

The communications manager 620 may support wireless communication at a UE in accordance with examples as disclosed herein. The SSB component 625 may be configured as or otherwise support a means for measuring a set of SSBs. The beam selector component 630 may be configured as or otherwise support a means for selecting a set of candidate beams for measuring a CSI-RS based on a power measurement associated with an uplink performance. In some examples, the beam selector component 630 may be configured as or otherwise support a means for selecting a subset of the candidate beams for measuring the CSI-RS based on the set of SSB measurements. The spectral efficiency component 635 may be configured as or otherwise support a means for measuring a spectral efficiency using a first candidate beam from the subset of the set of candidate beams based on the CSI-RS. The reporter component 640 may be configured as or otherwise support a means for transmitting, to a network entity, the spectral efficiency measurement based on measuring the spectral efficiency using the candidate UE beam.

In some examples, the power measurement component 645 may be configured as or otherwise support a means for calculating the power measurement based on a difference between a power threshold and a reference power value. In some examples, the beam selector component 630 may be configured as or otherwise support a means for determining a quantity of UE beams for the set of candidate UE beams based on the calculated power measurement.

In some examples, the power measurement component 645 may be configured as or otherwise support a means for calculating the power threshold based on a difference between a transmit power value, a first power reduction value, and a second power reduction value, where the power threshold is a MTPL.

In some examples, the power measurement component 645 may be configured as or otherwise support a means for calculating the reference power value based on a combination of an uplink channel value, a pathloss value, a frequency, and a bandwidth value, where the reference power value is a reference requested power.

In some examples, the bandwidth value includes a maximum transmission bandwidth and a quantity of carriers.

In some examples, the power measurement includes one or more vPHR values associated with respective beams of the set of candidate UE beams.

In some examples, selecting the set of candidate UE beams is based on the power measurement being positive.

In some examples, the beam selector component 630 may be configured as or otherwise support a means for selecting a serving UE beam for measuring the CSI-RS based on the set of SSB measurements. In some examples, the reporter component 640 may be configured as or otherwise support a means for generating a measurement report based on the spectral efficiency measurement and a last CSI-RS measurement on the serving UE beam.

In some examples, the beam selector component 630 may be configured as or otherwise support a means for reselecting the serving UE beam based on measuring the CSI-RS.

In some examples, to support reselecting the serving UE beam, the beam selector component 630 may be configured as or otherwise support a means for performing a filtering, a biasing, a thresholding, or any combination thereof, for a first rank and a second rank of a measurement of the CSI-RS, where reselection of the serving UE beam is based on the filtering, the biasing, the thresholding, or any combination thereof.

In some examples, the predictor component 650 may be configured as or otherwise support a means for predicting a set of time resources for the CSI-RS based on one or more previous CSI-RS configurations.

In some examples, the slot component 655 may be configured as or otherwise support a means for determining a slot format for a slot including a set of time resources for the CSI-RS, where the slot format includes at least one downlink shared channel resource. In some examples, the slot component 655 may be configured as or otherwise support a means for monitoring the slot using the candidate UE beam based on determining the slot format, where the CSI-RS is measured based on monitoring the slot.

In some examples, the reference signal component 660 may be configured as or otherwise support a means for measuring a demodulation reference signal on the at least one downlink shared channel resource using the candidate UE beam. In some examples, the reference signal component 660 may be configured as or otherwise support a means for performing channel estimation for the slot based on measuring the demodulation reference signal.

In some examples, the reference signal component 660 may be configured as or otherwise support a means for using the candidate UE beam for a set of multiple slots based on a time window around a set of time resources for the CSI-RS, where the CSI-RS is measured during at least a symbol in the set of multiple slots.

In some examples, the scheduler component 665 may be configured as or otherwise support a means for determining a scheduling variation for the network entity, where the candidate UE beam is used for the set of multiple slots based on the scheduling variation.

In some examples, to support using the candidate UE beam for the set of multiple slots, the communicator component 670 may be configured as or otherwise support a means for using the candidate UE beam for uplink communications and downlink communications during the set of multiple slots.

In some examples, the slot component 655 may be configured as or otherwise support a means for monitoring a slot including a set of time resources for the CSI-RS using the candidate UE beam, where the CSI-RS is measured on a different symbol of the slot than a predicted symbol for the CSI-RS of the set of time resources.

In some examples, the predictor component 650 may be configured as or otherwise support a means for identifying a set of time resources for the CSI-RS based on one or more previous CSI-RS configurations. In some examples, the reference signal component 660 may be configured as or otherwise support a means for identifying an aperiodic reference signal resource configuration from the one or more previous CSI-RS configurations. In some examples, the scheduler component 665 may be configured as or otherwise support a means for determining scheduling information for one or more previous channel state information measurements based on the aperiodic reference signal resource configuration, where the set of time resources is identified based on the scheduling information.

In some examples, the spectral efficiency component 635 may be configured as or otherwise support a means for measuring the spectral efficiency separately for each rank of the candidate UE beam.

In some examples, the beam selector component 630 may be configured as or otherwise support a means for updating the subset based on measuring the CSI-RS, additional SSB measurements, one or more CSI-RS measurements using one or more additional candidate UE beams, or any combination thereof.

In some examples, to support identifying the subset, the beam selector component 630 may be configured as or otherwise support a means for identifying the subset from a subset of beams used for the set of SSB measurements.

In some examples, the subset of the candidate UE beams are identified based on a reference signal received power measurement of the subset of beams used for the set of SSB measurements.

In some examples, the subset of the candidate UE beams are identified based on a channel impulse response measurement of the subset of beams used for the set of SSB measurements.

In some examples, the subset of the candidate UE beams are identified based on an uplink link budget of the UE.

In some examples, the CSI-RS is an acquisition CSI-RS.

Figure 7:
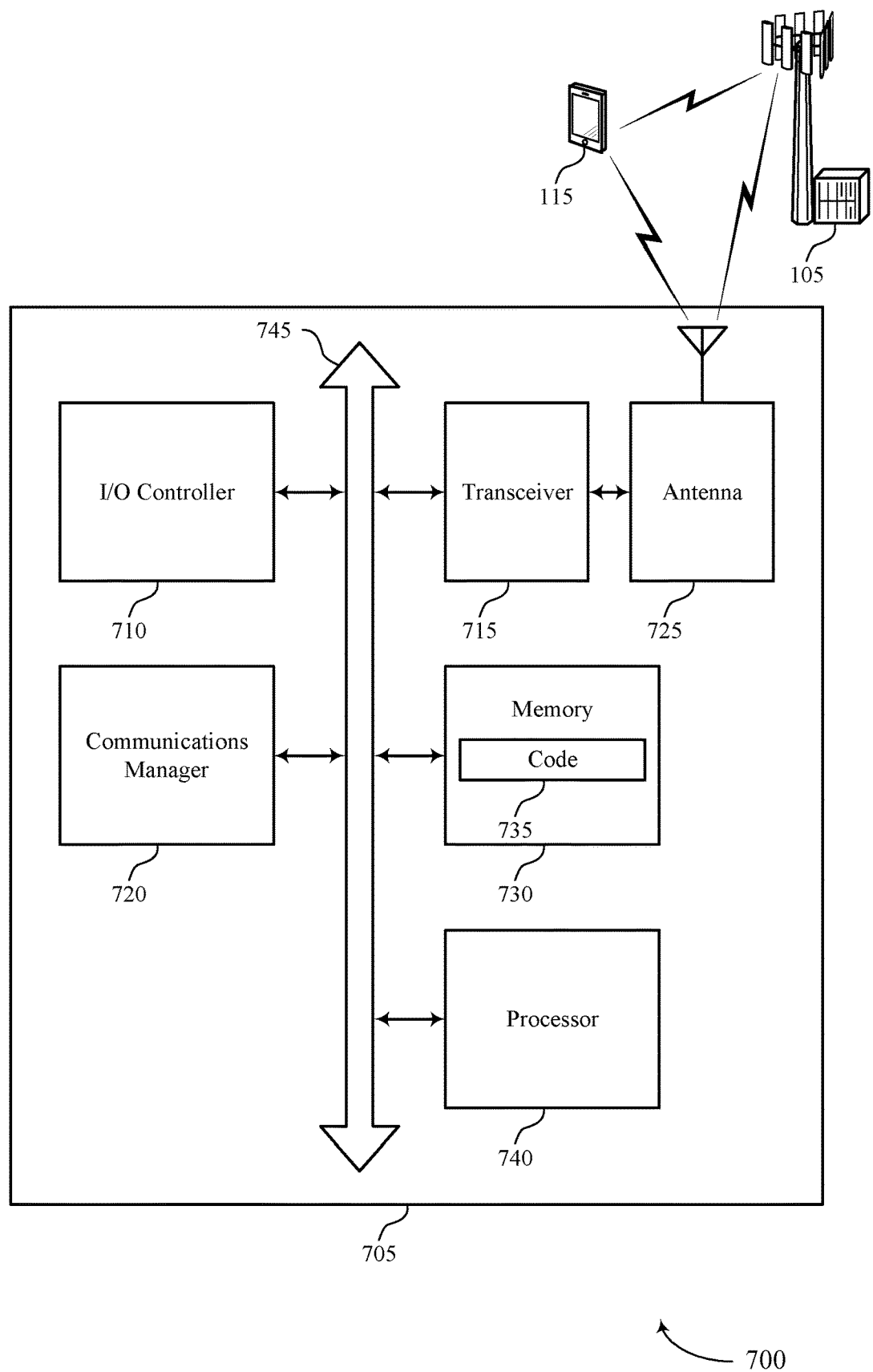
FIG. 7 shows a diagram of a system including a device that supports techniques for beam selection with uplink consideration in accordance with one or more aspects of the present disclosure.

FIG. 7 shows a diagram of a system 700 including a device 705 that supports techniques for beam selection with uplink consideration in accordance with one or more aspects of the present disclosure. The device 705 may be an example of or include the components of a device 405, a device 505, or a UE 115 as described herein. The device 705 may communicate (e.g., wirelessly) with one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for beam selection with uplink consideration). For example, the device 705 or a component of the device 705 may include a processor 740 and memory 730 coupled with or to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for measuring a set of SSBs. The communications manager 720 may be configured as or otherwise support a means for selecting a set of candidate beams for measuring a CSI-RS based on a power measurement associated with an uplink performance. The communications manager 720 may be configured as or otherwise support a means for selecting a subset of the candidate beams for measuring the CSI-RS based on the set of SSB measurements. The communications manager 720 may be configured as or otherwise support a means for measuring a spectral efficiency using a first candidate beam from the subset of the set of candidate beams based on the CSI-RS. The communications manager 720 may be configured as or otherwise support a means for transmitting, to a network entity, the spectral efficiency measurement based on measuring the spectral efficiency using the candidate UE beam.

By including or configuring the communications manager 720 in accordance with examples as described herein, the device 705 may support techniques for increased uplink performance, more efficient selection of beams for uplink communication, and more efficient utilization of communication resources.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for beam selection with uplink consideration as described herein, or the processor 740 and the memory 730 may be otherwise configured to perform or support such operations.

Figure 8:
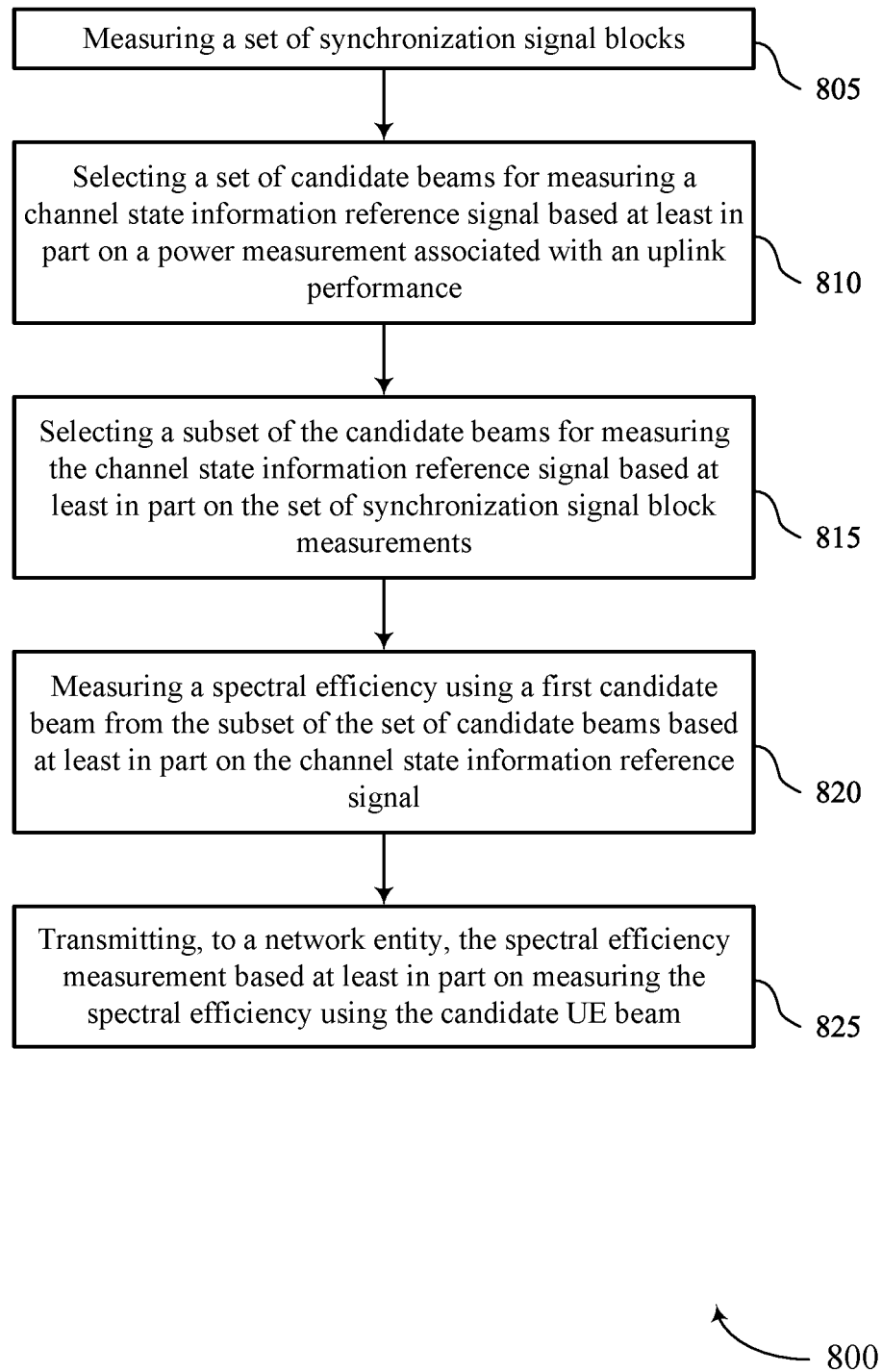
FIGS. 8 through 10 show flowcharts illustrating methods that support techniques for beam selection with uplink consideration in accordance with one or more aspects of the present disclosure.

FIG. 8 shows a flowchart illustrating a method 800 that supports techniques for beam selection with uplink consideration in accordance with one or more aspects of the present disclosure. The operations of the method 800 may be implemented by a UE or its components as described herein.

For example, the operations of the method 800 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 805, the method may include measuring a set of SSBs. The operations of 805 may be performed in accordance with examples as disclosed herein. In some examples, aspects of the operations of 805 may be performed by an SSB component 625 as described with reference to FIG. 6.

At 810, the method may include selecting a set of candidate beams for measuring a CSI-RS based on a power measurement associated with an uplink performance. The operations of 810 may be performed in accordance with examples as disclosed herein. In some examples, aspects of the operations of 810 may be performed by a beam selector component 630 as described with reference to FIG. 6.

At 815, the method may include selecting a subset of the candidate beams for measuring the CSI-RS based on the set of SSB measurements. The operations of 815 may be performed in accordance with examples as disclosed herein. In some examples, aspects of the operations of 815 may be performed by a beam selector component 630 as described with reference to FIG. 6.

At 820, the method may include measuring a spectral efficiency using a first candidate beam from the subset of the set of candidate beams based on the CSI-RS. The operations of 820 may be performed in accordance with examples as disclosed herein. In some examples, aspects of the operations of 820 may be performed by a spectral efficiency component 635 as described with reference to FIG. 6.

At 825, the method may include transmitting, to a network entity, the spectral efficiency measurement based on measuring the spectral efficiency using the candidate UE beam. The operations of 825 may be performed in accordance with examples as disclosed herein. In some examples, aspects of the operations of 825 may be performed by a reporter component 640 as described with reference to FIG. 6.

Figure 9:
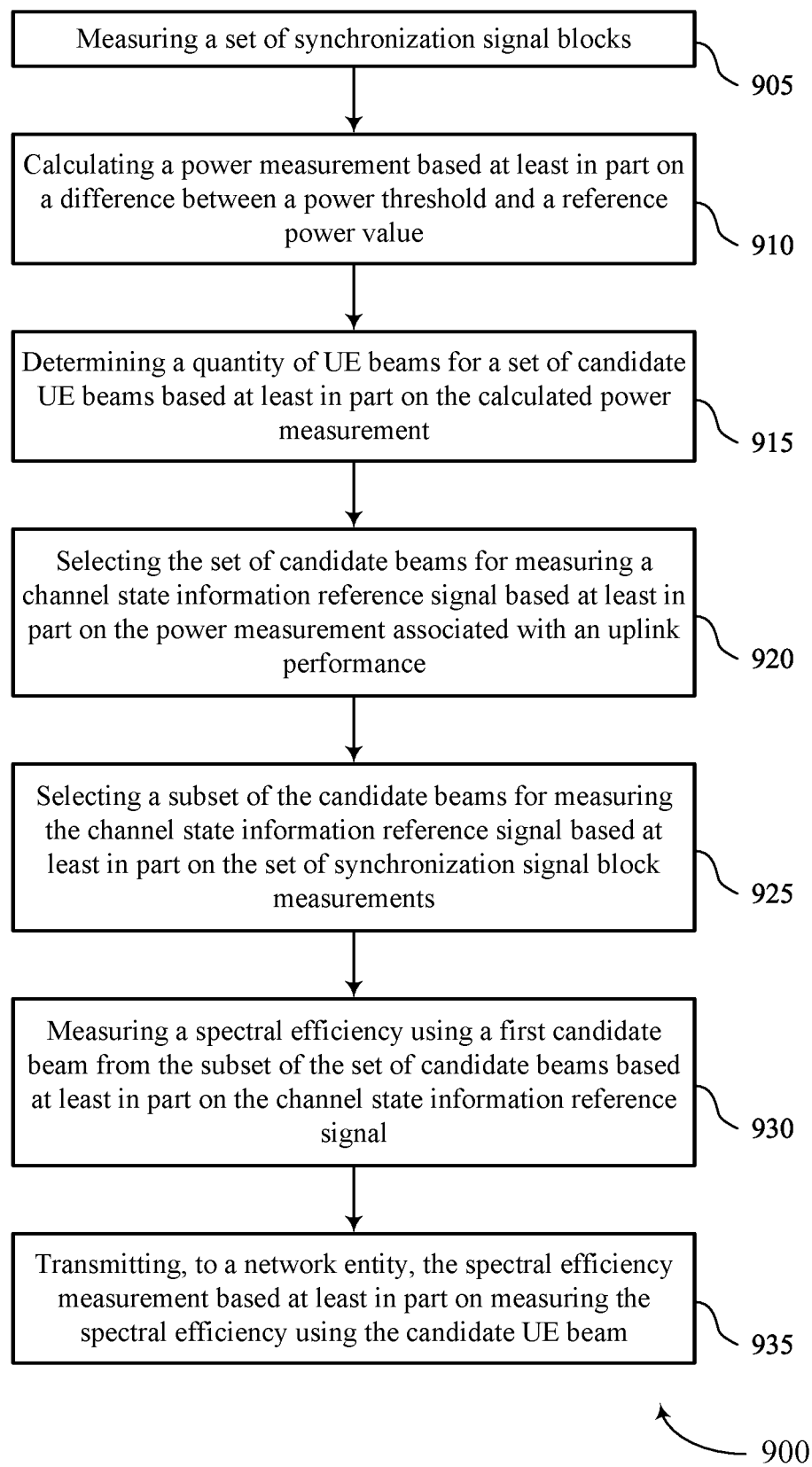

FIG. 9 shows a flowchart illustrating a method 900 that supports techniques for beam selection with uplink consideration in accordance with one or more aspects of the present disclosure. The operations of the method 900 may be implemented by a UE or its components as described herein. For example, the operations of the method 900 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 905, the method may include measuring a set of SSBs. The operations of 905 may be performed in accordance with examples as disclosed herein. In some examples, aspects of the operations of 905 may be performed by an SSB component 625 as described with reference to FIG. 6.

At 910, the method may include calculating a power measurement based on a difference between a power threshold and a reference power value. The operations of 910 may be performed in accordance with examples as disclosed herein. In some examples, aspects of the operations of 910 may be performed by a power measurement component 645 as described with reference to FIG. 6.

At 915, the method may include determining a quantity of UE beams for a set of candidate UE beams based on the calculated power measurement. The operations of 915 may be performed in accordance with examples as disclosed herein. In some examples, aspects of the operations of 915 may be performed by a beam selector component 630 as described with reference to FIG. 6.

At 920, the method may include selecting the set of candidate beams for measuring a CSI-RS based on the power measurement associated with an uplink performance. The operations of 920 may be performed in accordance with examples as disclosed herein. In some examples, aspects of the operations of 920 may be performed by a beam selector component 630 as described with reference to FIG. 6.

At 925, the method may include selecting a subset of the candidate beams for measuring the CSI-RS based on the set of SSB measurements. The operations of 925 may be performed in accordance with examples as disclosed herein. In some examples, aspects of the operations of 925 may be performed by a beam selector component 630 as described with reference to FIG. 6.

At 930, the method may include measuring a spectral efficiency using a first candidate beam from the subset of the set of candidate beams based on the CSI-RS. The operations of 930 may be performed in accordance with examples as disclosed herein. In some examples, aspects of the operations of 930 may be performed by a spectral efficiency component 635 as described with reference to FIG. 6.

At 935, the method may include transmitting, to a network entity, the spectral efficiency measurement based on measuring the spectral efficiency using the candidate UE beam. The operations of 935 may be performed in accordance with examples as disclosed herein. In some examples, aspects of the operations of 935 may be performed by a reporter component 640 as described with reference to FIG. 6.

Figure 10:
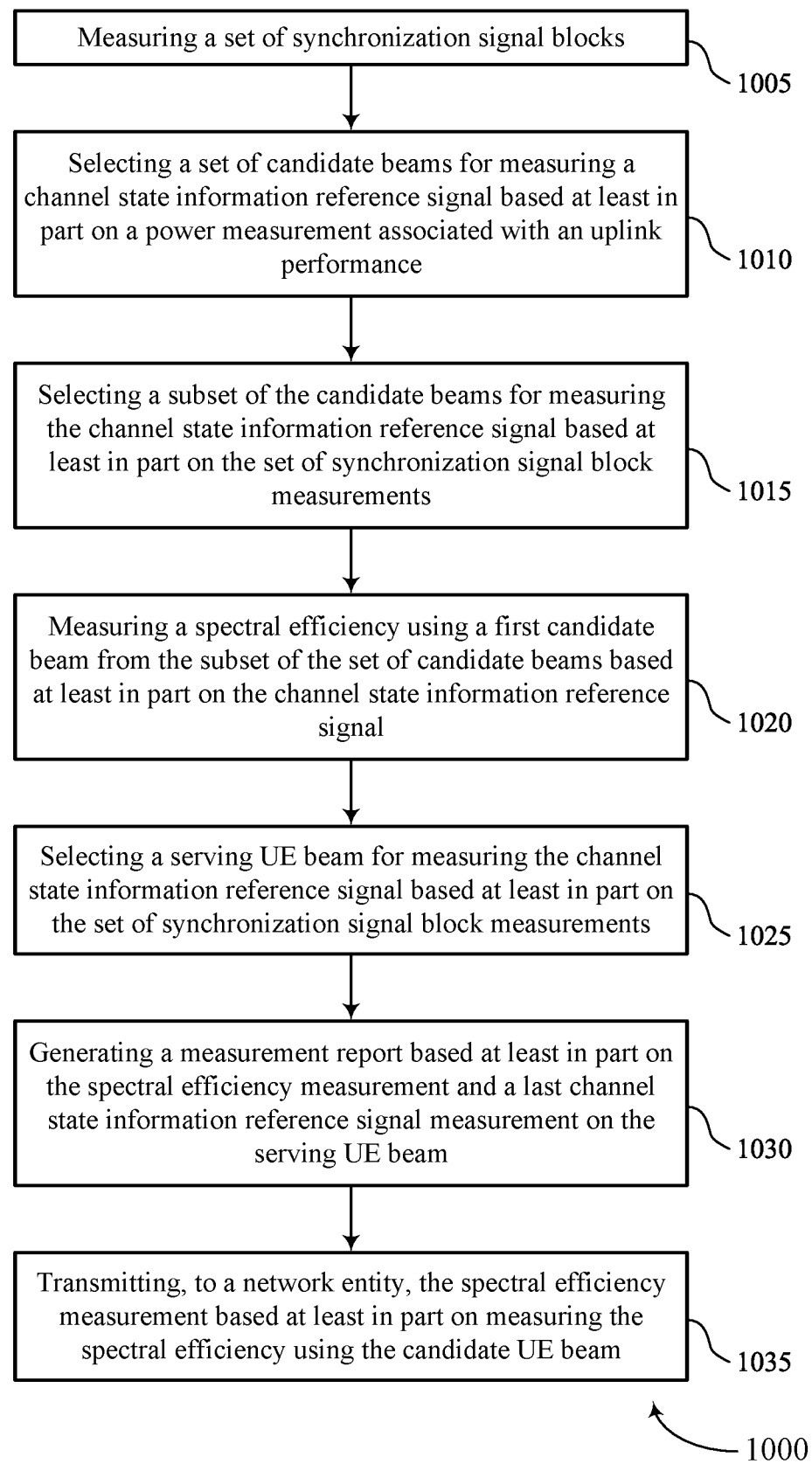

FIG. 10 shows a flowchart illustrating a method 1000 that supports techniques for beam selection with uplink consideration in accordance with one or more aspects of the present disclosure. The operations of the method 1000 may be implemented by a UE or its components as described herein. For example, the operations of the method 1000 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1005, the method may include measuring a set of SSBs. The operations of 1005 may be performed in accordance with examples as disclosed herein. In some examples, aspects of the operations of 1005 may be performed by an SSB component 625 as described with reference to FIG. 6.

At 1010, the method may include selecting a set of candidate beams for measuring a CSI-RS based on a power measurement associated with an uplink performance. The operations of 1010 may be performed in accordance with examples as disclosed herein. In some examples, aspects of the operations of 1010 may be performed by a beam selector component 630 as described with reference to FIG. 6.

At 1015, the method may include selecting a subset of the candidate beams for measuring the CSI-RS based on the set of SSB measurements. The operations of 1015 may be performed in accordance with examples as disclosed herein. In some examples, aspects of the operations of 1015 may be performed by a beam selector component 630 as described with reference to FIG. 6.

At 1020, the method may include measuring a spectral efficiency using a first candidate beam from the subset of the set of candidate beams based on the CSI-RS. The operations of 1020 may be performed in accordance with examples as disclosed herein. In some examples, aspects of the operations of 1020 may be performed by a spectral efficiency component 635 as described with reference to FIG. 6.

At 1025, the method may include selecting a serving UE beam for measuring the CSI-RS based on the set of SSB measurements. The operations of 1025 may be performed in accordance with examples as disclosed herein. In some examples, aspects of the operations of 1025 may be performed by a beam selector component 630 as described with reference to FIG. 6.

At 1030, the method may include generating a measurement report based on the spectral efficiency measurement and a last CSI-RS measurement on the serving UE beam. The operations of 1030 may be performed in accordance with examples as disclosed herein. In some examples, aspects of the operations of 1030 may be performed by a reporter component 640 as described with reference to FIG. 6.

At 1035, the method may include transmitting, to a network entity, the spectral efficiency measurement based on measuring the spectral efficiency using the candidate UE beam. The operations of 1035 may be performed in accordance with examples as disclosed herein. In some examples, aspects of the operations of 1035 may be performed by a reporter component 640 as described with reference to FIG. 6.

The following provides an overview of aspects of the present disclosure:

Aspect 1: A method for wireless communication at a UE, comprising: measuring a set of synchronization signal blocks; selecting a set of candidate beams for measuring a channel state information reference signal based at least in part on a power measurement associated with an uplink performance; selecting a subset of the candidate beams for measuring the channel state information reference signal based at least in part on the set of synchronization signal block measurements; measuring a spectral efficiency using a first candidate beam from the subset of the set of candidate beams based at least in part on the channel state information reference signal; and transmitting, to a network entity, the spectral efficiency measurement based at least in part on measuring the spectral efficiency using the candidate UE beam.

Aspect 2: The method of aspect 1, further comprising: calculating the power measurement based at least in part on a difference between a power threshold and a reference power value; and determining a quantity of UE beams for the set of candidate UE beams based at least in part on the calculated power measurement.

Aspect 3: The method of aspect 2, further comprising: calculating the power threshold based at least in part on a difference between a transmit power value, a first power reduction value, and a second power reduction value, wherein the power threshold is a maximum transmit power limit.

Aspect 4: The method of any of aspects 2 through 3, further comprising: calculating the reference power value based at least in part on a combination of an uplink channel value, a pathloss value, a frequency, and a bandwidth value, wherein the reference power value is a reference requested power.

Aspect 5: The method of aspect 4, wherein the bandwidth value comprises a maximum transmission bandwidth and a quantity of carriers.

Aspect 6: The method of any of aspects 1 through 5, wherein the power measurement comprises one or more virtual power headroom values associated with respective beams of the set of candidate UE beams.

Aspect 7: The method of any of aspects 1 through 6, wherein selecting the set of candidate UE beams is based at least in part on the power measurement being positive.

Aspect 8: The method of any of aspects 1 through 7, further comprising: selecting a serving UE beam for measuring the channel state information reference signal based at least in part on the set of synchronization signal block measurements; and generating a measurement report based at least in part on the spectral efficiency measurement and a last channel state information reference signal measurement on the serving UE beam.

Aspect 9: The method of aspect 8, further comprising: reselecting the serving UE beam based at least in part on measuring the channel state information reference signal.

Aspect 10: The method of aspect 9, wherein reselecting the serving UE beam further comprises: performing a filtering, a biasing, a thresholding, or any combination thereof, for a first rank and a second rank of a measurement of the channel state information reference signal, wherein reselection of the serving UE beam is based at least in part on the filtering, the biasing, the thresholding, or any combination thereof.

Aspect 11: The method of any of aspects 1 through 10, further comprising: predicting a set of time resources for the channel state information reference signal based at least in part on one or more previous channel state information reference signal configurations.

Aspect 12: The method of any of aspects 1 through 11, further comprising: determining a slot format for a slot including a set of time resources for the channel state information reference signal, wherein the slot format comprises at least one downlink shared channel resource; and monitoring the slot using the candidate UE beam based at least in part on determining the slot format, wherein the channel state information reference signal is measured based at least in part on monitoring the slot.

Aspect 13: The method of aspect 12, further comprising: measuring a demodulation reference signal on the at least one downlink shared channel resource using the candidate UE beam; and performing channel estimation for the slot based at least in part on measuring the demodulation reference signal.

Aspect 14: The method of any of aspects 1 through 13, further comprising: using the candidate UE beam for a plurality of slots based at least in part on a time window around a set of time resources for the channel state information reference signal, wherein the channel state information reference signal is measured during at least a symbol in the plurality of slots.

Aspect 15: The method of aspect 14, further comprising: determining a scheduling variation for the network entity, wherein the candidate UE beam is used for the plurality of slots based at least in part on the scheduling variation.

Aspect 16: The method of any of aspects 14 through 15, wherein using the candidate UE beam for the plurality of slots comprises: using the candidate UE beam for uplink communications and downlink communications during the plurality of slots.

Aspect 17: The method of any of aspects 1 through 16, further comprising: monitoring a slot including a set of time resources for the channel state information reference signal using the candidate UE beam, wherein the channel state information reference signal is measured on a different symbol of the slot than a predicted symbol for the channel state information reference signal of the set of time resources.

Aspect 18: The method of any of aspects 1 through 17, further comprising: identifying a set of time resources for the channel state information reference signal based at least in part on one or more previous channel state information reference signal configurations; identifying an aperiodic reference signal resource configuration from the one or more previous channel state information reference signal configurations; and determining scheduling information for one or more previous channel state information measurements based at least in part on the aperiodic reference signal resource configuration, wherein the set of time resources is identified based at least in part on the scheduling information.

Aspect 19: The method of any of aspects 1 through 18, further comprising: measuring the spectral efficiency separately for each rank of the candidate UE beam.

Aspect 20: The method of any of aspects 1 through 19, further comprising: updating the subset based at least in part on measuring the channel state information reference signal, additional synchronization signal block measurements, one or more channel state information reference signal measurements using one or more additional candidate UE beams, or any combination thereof.

Aspect 21: The method of any of aspects 1 through 20, wherein identifying the subset comprises: identifying the subset from a subset of beams used for the set of synchronization signal block measurements.

Aspect 22: The method of aspect 21, wherein the subset of the candidate UE beams are identified based at least in part on a reference signal received power measurement of the subset of beams used for the set of synchronization signal block measurements.

Aspect 23: The method of any of aspects 21 through 22, wherein the subset of the candidate UE beams are identified based at least in part on a channel impulse response measurement of the subset of beams used for the set of synchronization signal block measurements.

Aspect 24: The method of any of aspects 21 through 23, wherein the subset of the candidate UE beams are identified based at least in part on an uplink link budget of the UE.

Aspect 25: The method of any of aspects 1 through 24, wherein the channel state information reference signal is an acquisition channel state information reference signal.

Aspect 26: An apparatus for wireless communication at a UE, comprising a processor; memory coupled with the processor; and instructions stored in the memory and executable by the processor to cause the apparatus to perform a method of any of aspects 1 through 25.

Aspect 27: An apparatus for wireless communication at a UE, comprising at least one means for performing a method of any of aspects 1 through 25.

Aspect 28: A non-transitory computer-readable medium storing code for wireless communication at a UE, the code comprising instructions executable by a processor to perform a method of any of aspects 1 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    measuring a set of synchronization signal blocks;
    selecting a set of candidate beams for measuring a channel state information reference signal based at least in part on a power measurement associated with an uplink performance;
    selecting a subset of the set of candidate beams for measuring the channel state information reference signal based at least in part on the measurements of the set of synchronization signal blocks;
    measuring a spectral efficiency using a first candidate beam from the subset of the set of candidate beams based at least in part on the channel state information reference signal; and
    transmitting, to a network entity, the measurement of the spectral efficiency based at least in part on measuring the spectral efficiency using the first candidate beam.

2. The method of claim 1, further comprising:
    calculating the power measurement based at least in part on a difference between a power threshold and a reference power value; and
    determining a quantity of UE beams for the set of candidate beams based at least in part on the calculated power measurement.

3. The method of claim 2, further comprising:
    calculating the power threshold based at least in part on a difference between a transmit power value, a first power reduction value, and a second power reduction value, wherein the power threshold is a maximum transmit power limit.

4. The method of claim 2, further comprising:
    calculating the reference power value based at least in part on a combination of an uplink channel value, a pathloss value, a frequency, and a bandwidth value, wherein the reference power value is a reference requested power.

5. The method of claim 4, wherein the bandwidth value comprises a maximum transmission bandwidth and a quantity of carriers.

6. The method of claim 1, wherein the power measurement comprises one or more virtual power headroom values associated with respective beams of the set of candidate beams.

7. The method of claim 1, wherein selecting the set of candidate beams is based at least in part on the power measurement being positive.

8. The method of claim 1, further comprising:
    selecting a serving UE beam for measuring the channel state information reference signal based at least in part on the measurements of the set of synchronization signal blocks; and
    generating a measurement report based at least in part on the measurement of the spectral efficiency and a last channel state information reference signal measurement on the serving UE beam.

9. The method of claim 8, further comprising:
    reselecting the serving UE beam based at least in part on measuring the channel state information reference signal.

10. The method of claim 9, wherein reselecting the serving UE beam further comprises:
    performing a filtering, a biasing, a thresholding, or any combination thereof, for a first rank and a second rank of a measurement of the channel state information reference signal, wherein reselection of the serving UE beam is based at least in part on the filtering, the biasing, the thresholding, or any combination thereof.

11. The method of claim 1, further comprising:
predicting a set of time resources for the channel state information reference signal based at least in part on one or more previous channel state information reference signal configurations.

12. The method of claim 1, further comprising:
determining a slot format for a slot including a set of time resources for the channel state information reference signal, wherein the slot format comprises at least one downlink shared channel resource; and
monitoring the slot using the first candidate beam based at least in part on determining the slot format, wherein the channel state information reference signal is measured based at least in part on monitoring the slot.

13. The method of claim 12, further comprising:
measuring a demodulation reference signal on the at least one downlink shared channel resource using the first candidate beam; and
performing channel estimation for the slot based at least in part on measuring the demodulation reference signal.

14. The method of claim 1, further comprising:
using the first candidate beam for a plurality of slots based at least in part on a time window around a set of time resources for the channel state information reference signal, wherein the channel state information reference signal is measured during at least a symbol in the plurality of slots.

15. The method of claim 14, further comprising:
determining a scheduling variation for the network entity, wherein the first candidate beam is used for the plurality of slots based at least in part on the scheduling variation.

16. The method of claim 14, wherein using the first candidate beam for the plurality of slots comprises:
using the first candidate beam for uplink communications and downlink communications during the plurality of slots.

17. The method of claim 1, further comprising:
monitoring a slot including a set of time resources for the channel state information reference signal using the first candidate beam, wherein the channel state information reference signal is measured on a different symbol of the slot than a predicted symbol for the channel state information reference signal of the set of time resources.

18. The method of claim 1, further comprising:
identifying a set of time resources for the channel state information reference signal based at least in part on one or more previous channel state information reference signal configurations;
identifying an aperiodic reference signal resource configuration from the one or more previous channel state information reference signal configurations; and
determining scheduling information for one or more previous channel state information measurements based at least in part on the aperiodic reference signal resource configuration, wherein the set of time resources is identified based at least in part on the scheduling information.

19. The method of claim 1, further comprising:
measuring the spectral efficiency separately for each rank of the first candidate beam.

20. The method of claim 1, further comprising:
updating the subset based at least in part on measuring the channel state information reference signal, additional synchronization signal block measurements, one or more channel state information reference signal measurements using one or more additional candidate UE beams, or any combination thereof.

21. The method of claim 1, wherein identifying the subset comprises:
identifying the subset from a subset of beams used for the measurements of the set of synchronization signal blocks.

22. The method of claim 21, wherein the subset of the set of candidate beams are identified based at least in part on a reference signal received power measurement of the subset of beams used for the measurements of the set of synchronization signal blocks.

23. The method of claim 21, wherein the subset of the set of candidate beams are identified based at least in part on a channel impulse response measurement of the subset of beams used for the measurements of the set of synchronization signal blocks.

24. The method of claim 21, wherein the subset of the set of candidate beams are identified based at least in part on an uplink link budget of the UE.

25. The method of claim 1, wherein the channel state information reference signal is an acquisition channel state information reference signal.

26. An apparatus for wireless communication at a user equipment (UE), comprising:
a processor;
memory coupled with the processor; and
instructions stored in the memory and executable by the processor to cause the apparatus to:
measure a set of synchronization signal blocks;
select a set of candidate beams for measuring a channel state information reference signal based at least in part on a power measurement associated with an uplink performance;
select a subset of the set of candidate beams for measuring the channel state information reference signal based at least in part on the measurements of the set of synchronization signal blocks;
measure a spectral efficiency using a first candidate beam from the subset of the set of candidate beams based at least in part on the channel state information reference signal; and
transmit, to a network entity, the measurement of the spectral efficiency based at least in part on measuring the spectral efficiency using the first candidate beam.

27. The apparatus of claim 26, wherein the instructions are further executable by the processor to cause the apparatus to:
calculate the power measurement based at least in part on a difference between a power threshold and a reference power value; and
determine a quantity of UE beams for the set of candidate beams based at least in part on the calculated power measurement.

28. The apparatus of claim 27, wherein the instructions are further executable by the processor to cause the apparatus to:
calculate the power threshold based at least in part on a difference between a transmit power value, a first power reduction value, and a second power reduction value, wherein the power threshold is a maximum transmit power limit.

29. An apparatus for wireless communication at a user equipment (UE), comprising:

means for measuring a set of synchronization signal blocks;

means for selecting a set of candidate beams for measuring a channel state information reference signal based at least in part on a power measurement associated with an uplink performance;

means for selecting a subset of the set of candidate beams for measuring the channel state information reference signal based at least in part on the measurements of the set of synchronization signal blocks;

means for measuring a spectral efficiency using a first candidate beam from the subset of the set of candidate beams based at least in part on the channel state information reference signal; and means for transmitting, to a network entity, the measurement of the spectral efficiency based at least in part on measuring the spectral efficiency using the first candidate beam.

30. A non-transitory computer-readable medium storing code for wireless communication at a user equipment (UE), the code comprising instructions executable by a processor to:

measure a set of synchronization signal blocks;

select a set of candidate beams for measuring a channel state information reference signal based at least in part on a power measurement associated with an uplink performance;

select a subset of the set of candidate beams for measuring the channel state information reference signal based at least in part on the measurements of the set of synchronization signal blocks;

measure a spectral efficiency using a first candidate beam from the subset of the set of candidate beams based at least in part on the channel state information reference signal; and transmit, to a network entity, the measurement of the spectral efficiency based at least in part on measuring the spectral efficiency using the first candidate beam.

* * * * *